United States Patent [19]

Hayashigawa et al.

[11] 4,422,851
[45] Dec. 27, 1983

[54] ISOMETRIC GRIP BENDING BEAM CONTROL

[75] Inventors: Lawrence Hayashigawa, Tustin; Bertram W. McFadden, Downey, both of Calif.

[73] Assignee: The United States of America as represented by the Secretary of the Navy, Washington, D.C.

[21] Appl. No.: 377,240

[22] Filed: May 12, 1982

[51] Int. Cl.³ .............................................. G09B 9/08
[52] U.S. Cl. .................................... 434/45; 244/223
[58] Field of Search ..................... 434/30, 45; 46/1 B, 46/1 H; 74/470; 244/223, 228

[56] References Cited

U.S. PATENT DOCUMENTS

| | | | |
|---|---|---|---|
| 2,804,698 | 9/1957 | Grandmont | 434/45 |
| 2,881,993 | 4/1959 | Browne | 244/223 |
| 2,940,699 | 6/1960 | Plummer | 244/288 |
| 3,303,714 | 2/1967 | Fontaine | 74/470 |
| 3,303,715 | 2/1967 | Zimer | 74/470 |
| 3,691,669 | 9/1972 | Folson | 46/1 H |
| 3,903,614 | 9/1975 | Diamond et al. | 434/45 |
| 4,024,651 | 5/1977 | Lantrip | 434/45 |
| 4,236,325 | 12/1980 | Hall | 434/45 |

*Primary Examiner*—William H. Grieb
*Attorney, Agent, or Firm*—Robert F. Beers; Robert W. Adams; Robert J. Veal

[57] ABSTRACT

A control stick simulator for use in a part task trainer for pilots utilizes a bending beam in cooperation with deflection sensing transducers to output pitch and roll commands. The control stick is a cantilevered metallic beam, arrested by stops in a mounting flange near a handgrip at its upper end, thereby presenting an isometric feel to the pilot.

9 Claims, 2 Drawing Figures

ISOMETRIC GRIP BENDING BEAM CONTROL

BACKGROUND OF THE INVENTION

1. Field of the Invention

The present invention relates to the training of aircraft pilots and more particularly to the training of pilots in simulators. Even more particularly, the present invention may be described as an isometric control stick for use in a part task training simulator.

2. Description of the Prior Art

There are a number of manual control designs for training aviators in existence today. Basically, however, the controls may be categorized into two types: active and passive. The active controller, usually called a control loader, generates control forces which are variable by computer commands. The passive controller is a hand control in which the control feel cues, i.e., control forces, are not variable during operation. The passive hand control is generally machanized in two configurations: the gimbal mounted hand grip and the isometric handgrip.

A control loading system, as an active controller, basically consists of a set of aircraft controls, a servoed loading system device, and an analog computer. Examples of control loading systems can be found in U.S. Pat. No. 2,804,698 to P. E. Grandmont, and U.S. Pat. No. 3,903,614 to John A. Diamond et al. Control loaders are utilized in high functioning aircraft simulators where pilot/aircraft stability or pilot control response to avionics equipment is evaluated or optimized. For cost and design reasons, the control loader is not feasible for control stick simulation in a partial task trainer.

The gimbal mounted system has appeared in numerous applications from flight controls to controlling arcade games. The usual mechanization of this type control attaches the handgrip to a 2-axis gimbal structure, thus providing the handgrip with pitch and roll motions. The major disadvantage of the gimbal mounted systems is that their attendant linkages, gears and cams tend to limit long term reliability.

SUMMARY OF THE INVENTION

The present invention provides a simple, maintenance free handgrip control stick for use in a part task aviation trainer. Although it is descriptively referred to as an isometric grip bending beam control, which implies zero motion, there is minute relative stick deflection, thus enabling detection devices to output pitch and roll signals. The computational complexity of a control loader is not needed, as the present device utilizes a semi-rigidly mounted control stick, thus providing a constant resistance to a trainee's input force.

The handgrip control is mounted on a cantilevered bending beam to which a plurality of sensing devices are attached to measure deflection or bending of the beam. These output signals are conditioned and represent pitch and roll input commands.

It is an object of the present invention to provide a trainee pilot in a part task simulator with a control stick which provides the basic feel characteristics of an aircraft control stick.

Yet another object of the present invention is to provide a durable, low maintenance control stick component for a part task trainer.

Yet another object of the invention is to provide the above objects at a reasonable cost.

The foregoing and other objects, features and advantages of the invention, and a better understanding of its construction and operation, will become apparent from the following description taken in conjunction with the accompanying drawings.

DESCRIPTION OF A PREFERRED EMBODIMENT

The aircraft pilot utilizes visual, aural, motion, and control feel cues to enable him to control and predict the behavior of the aircraft. Most visual, aural, and motion cues are relevant cues, whereas only part of the control feel cues are relevant. However, it has been theorized that the pilot "feels" the vehicle motion through the controls prior to visually sensing it.

The present invention is designed for use in a part task trainer which simulates night carrier landings/takeoffs, high altitude approach to bingo field, and various weapon deployment modes. The maneuvers thus encountered by the pilot in the trainer are predominately sensed or cued by the visual sensors. Consequently, the feel cues are at least secondary in the pilot sensor hierarchy.

Insofar as control stick cues are concerned, it is generally acknowledged that the pilot relies on the control stick force over other control stick cues, except possibly during landing maneuvers. For the part task trainer application, the isometric grip utilizing a bending beam was selected as the control stick simulator on its basis of a simple, straightforward design and its ability to conform to most of the control cue parameters.

Figure 1:
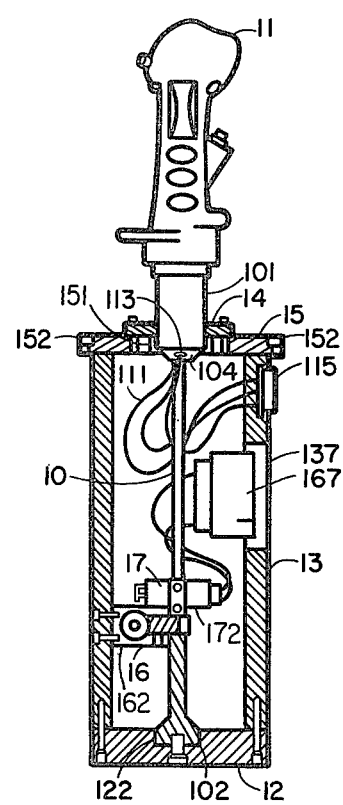
FIG. 1 is a cross-sectional representation of the present invention.
Figure 2:
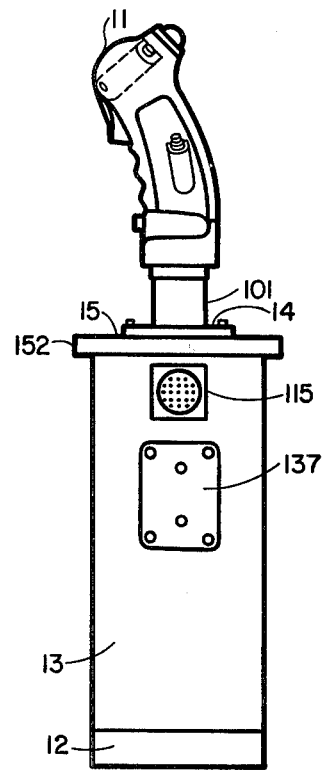
FIG. 2 is an exterior view of the present invention.

Referring to FIG. 1, a circular cross-section bending beam 10 was selected on the basis of ease of manufacturing and design. For infinite life, the maximum stress in the beam should not exceed the endurance limit of the material selected. For a 9-inch beam with a diameter of 0.313 inches, EDT 150 steel manufactured by Lasalle Steel has been found to be acceptable. A circular stop 14 near the upper end of bending beam 10 is used to prevent any overstressing of beam 10.

Beam 10 has a grip end 101 and a base end 102, both of which have an enlarged diameter, the grip end fitting within an aircraft handgrip 11. Handgrip 11 is a replica of a real aircraft handgrip. Handgrip 11 has electrical connections 111 attached to its electrical components. Connections 111 are internal and exit the grip through apertures 113 in a shoulder 104 connecting grip end 101 and the smaller diameter of bending beam 10. A jack 115 affixed to connections 111 provides attachment means to the electronic components of the part task trainer.

Base end 102 fits within a recess 122 in a base plate 12. Base end 102 is secured to base plate 12 by fastening means such as a single axial screw. Base plate 12 is attached to a large diameter tubing 13, which serves as the housing and also transmits the load from bending beam 10 to a mounting flange 15. Tubing 13 is metallic, preferrably aluminum. Jack 115 is mounted in the upper wall of tubing 13 near mounting flange 15.

Mounting flange 15 is attached to the upper end of tubing 13 and has a circular central aperture 151 through which grip end 101 of bending beam 10 extends. The outer rim 152 of flange 15 extends radially beyond tubing 13 and is used to mount the apparatus in the part task trainer. Mechanical stop 14 is an annular ring attached to the edge of aperture 151 and arrests the motion of bending beam 10 by contact with grip end 101.

Pitch and roll position outputs are provided by two linear variable differential transducers (LVDT) 16 and 17. The core rods of LVDTs 16 and 17, internal to LVDTs and not shown in the figure, are mounted on bending beam 10 at 90° to each other. The LVDT housings 162 and 172 are mounted to tubing 13. LVDTs were selected for the transducers because of their lower cost, infinite life, zero friction, and compact size. Model 200HR by Schaevitz has proven to be satisfactory.

The location of LVDTs 16 and 17 is governed by maximization of travel and maximum possible radial displacement in the bore of the LVDT. A modular LVDT signal conditioner 167, such as one manufactured by Schaevitz Engineering, Model SMS/GPM-108A, converts the LVDT signal to a usable high output D.C. voltage proportional to the core rod position which is a function of the deflection of bending beam 10. Conditioner 167 is mounted within tubing 13 on plate 137. An SK-24-32S connector provides electrical interface to the part task trainer.

It will be understood that the above description of the present invention is susceptible to various modifications, changes and adaptations, and the same are intended to be comprehended within the meaning and range of the equivalents of the appended claims.

What is claimed is:

1. An apparatus for simulating a control stick in an aviation trainer comprising:
   a hand grip:
   a cantilevered bending beam attached to said hand grip, said beam being a circular cross-section steel rod having an endurance limit in excess of the maximum stress exerted on said grip;
   means for restricting the displacement of said bending beam operably positioned therefor;
   means for measuring beam bending stress exerted on said hand grip operably attached to said bending beam, outputting signals proportional to pitch and roll positions.

2. The apparatus of claim 1, wherein said restricting means comprises:
   a base plate having a center aperture;
   fastening means attached to said bending beam through said center aperture;
   a tubular housing attached to the circumference of said base plate, enclosing said bending beam;
   a mounting plate attached to the upper end of said tubular housing, having a central aperture through which said bending beam extends; and
   an annular mechanical stop attached to said mounting plate about the circumference of said aperture for arresting the deflection of said bending beam.

3. An apparatus according to claim 1, wherein said measuring means comprises a plurality of linear variable differential transducers, each having a core rod and a housing, said core rod operably attached to said bending beam and said housing operably attached to said restricting means.

4. An apparatus according to claim 2, wherein said measuring means comprises:
   a plurality of linear variable differential transducers, each having a core rod and a housing, said core rods operably attached to said bending beam and said housing operably attached to said tubular housing, said transducers outputting signals in accordance with stress exerted on said bending beam; and
   a signal conditioner operably connected to receive the outputs of said transducers and outputting a high output D.C. voltage proportional to core rod position, said core rod position being equivalent to pitch and roll position in said trainer, said conditioner being mounted within said tubular housing.

5. An apparatus according to claim 3 or 4, wherein each of said plurality of linear variable differential transducers is mounted relative to said bending beam so as to maximize the displacement of said core rod within said housing when said bending beam is placed under stress.

6. An apparatus for simulating a center control stick in an aviation trainer comprising:
   a hand grip;
   a metallic bending beam having an upper, lower, and center portion of differing diameter, said upper portion affixed within said hand grip;
   a base plate having a central aperture and recess, said aperture being at the center of said recess, said recess receiving said lower portion of said bending beam;
   means for fastening said bending beam to said base plate via said central aperture;
   housing means surrounding said bending beam, fixedly attached to said base plate;
   a mounting plate for attaching said apparatus to said aviation trainer, affixed to said housing and extending radially beyond said housing, said mounting plate having a central aperture of diameter larger than said upper portion of said bending beam; and
   a mechanical stop attached to said mounting plate about said aperture for arresting the motion of said upper portion of said bending beam.

7. The apparatus of claim 6, wherein said handgrip has the shape and contour of an aircraft control stick handle, with the appurtenances thereto.

8. The apparatus of claim 7, further comprising:
   a jack mounted in said tubular housing for relaying electrical signals to said aviation trainer; and
   electrical connections between said handgrip and said jack.

9. An apparatus according to claim 6, further comprising:
   a plurality of linear variable differential transducers operably attached between said housing means and said central portion of said bending beam, outputting electrical signals proportional to pitch and roll commands exerted on said handgrip; and
   a signal conditioner electrically connected to receive signals from said transducers and outputting a D.C. voltage therefrom, physically attached inside said housing means.

* * * * *